Aug. 13, 1957 D. D. STELLMACHER ET AL 2,802,942

PULSE INTEGRATOR AND AMPLIFIER CIRCUITS OR THE LIKE

Filed May 21, 1954

DONALD D. STELLMACHER
OSCAR B. DUTTON
*INVENTORS*

BY Bruce L. Birchard

THEIR ATTORNEY

United States Patent Office 2,802,942

Patented Aug. 13, 1957

2,802,942

PULSE INTEGRATOR AND AMPLIFIER CIRCUITS OR THE LIKE

Donald D. Stellmacher, Los Angeles, and Oscar B. Dutton, Redondo Beach, Calif., assignors to Hoffman Electronics Corporation, a corporation of California Application May 21, 1954, Serial No. 431,446

2 Claims. (Cl. 250—27)

This invention is related to pulse amplifier circuits and, more particularly, to an improved pulse amplifier circuit which will produce a constant-level output pulse train irrespective of voltage fluctuations in the input pulse train, and which will also include means for detecting and indicating the pulse repetition frequency of the input pulse train.

In the past many attempts have been made to design pulse amplifier circuits. Invariably certain problems are encountered which render pulse amplifiers presently in use unsatisfactory for certain applications. It is desirable to include some type of indicator responsive to the pulse repetition frequency of the input pulse train in pulse amplifier circuits employed in Geiger counters, pulse frequency meters, and the like. Also, it is preferred to incorporate in such circuits a pulse amplifier which exhibits a constant-level output pulse train despite fluctuations in input pulse voltage.

Therefore, it is an object of this invention to provide an improved pulse amplifier circuit.

It is a further object of this invention to provide an improved pulse amplifier circuit which will incorporate indicating means responsive to the pulse repetition frequency of the signal being detected.

It is an additional object of this invention to provide a pulse integrator and amplifier circuit which will exhibit optimum reliability and which will lend itself to low-cost manufacture.

According to this invention, a pulse amplifier incorporates a gaseous discharge device connected in series with an ammeter which is responsive to average-current flow. The aforementioned gaseous discharge device is supplied with a voltage which may be adjusted to a level just below the ionization potential of this device. Audible indication of pulsing is also provided.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
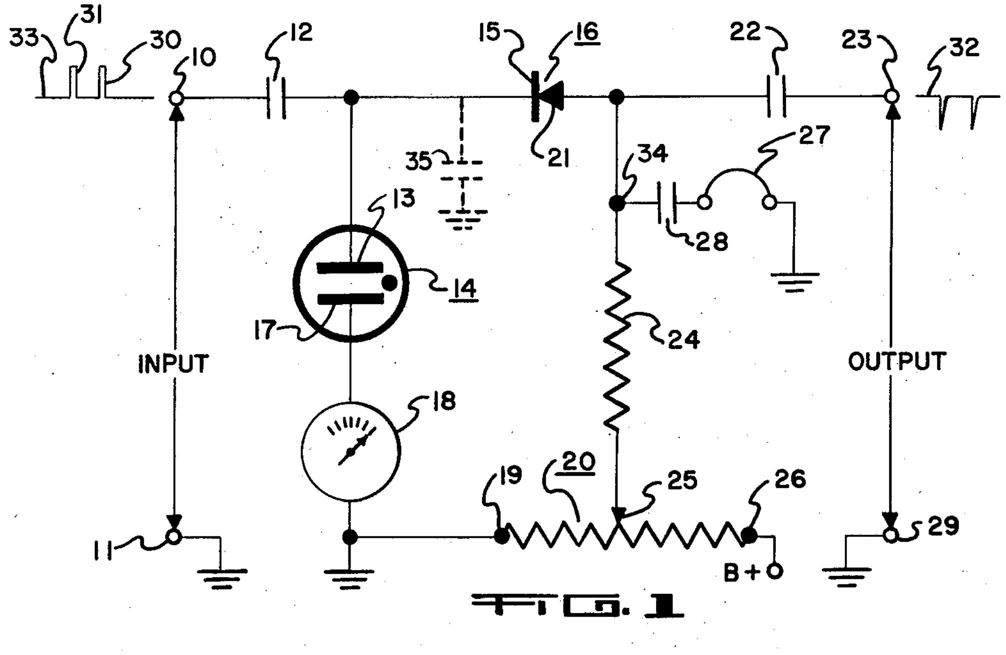
Figure 1 is a schematic diagram of a pulse integrator and amplifier circuit adapted to detect and amplify positive input pulses.

In Figure 1, input terminals 10 and 11 are for coupling to a pulse source (not shown). Input terminal 10 is coupled through capacitor 12 to first electrode 13, of gaseous discharge device 14, and also to first terminal 15 of diode 16. Input terminal 11 is maintained at ground potential. Second terminal 17 of gaseous discharge device 14 is connected through average-current reading indicator 18 to terminal 19 of potentiometer 20 and to ground. Second terminal 21 of diode 16 is connected through coupling capacitor 22 to output terminal 23, and also through resistor 24 to tap 25 of potentiometer 20. Terminal 26 of potentiometer 20 is coupled to a source of positive voltage (B+). Ear phones 27 are connected through capacitor 28 to terminal 34 of resistor 24, and also to ground. Second output terminal 29 is likewise connected to ground.

The circuit of Figure 1 operates as follows. The subject circuit is restricted to the detection and amplification of positive input pulses. Tap 25 of potentiometer 20 is adjusted to supply a potential to electrode 13 of gaseous discharge device 14 which is just below the ionization potential of said device. Positive input pulse 30, upon passing through coupling capacitor 12, will cause gaseous discharge device 14 to conduct a large current pulse. This current pulse will produce a voltage drop across resistor 24 which will reduce the potential applied to electrode 13 and cause gaseous discharge device 14 to become non-conductive once again. Gaseous discharge device 14 will remain non-conductive until input pulse 31 appears at electrode 13, at which time the above described phenomenon will re-occur. It becomes apparent that slight voltage variations in the input pulse train will have negligible effect upon the pulse magnitude of output pulse train 32 owing to the fact that once a state of conduction is achieved, gaseous discharge device 14 will exhibit a constant current output which is independent of slight fluctuations in applied pulse voltage. Stray capacitance 35 and capacitors 12, 22 and 28 discharge through resistor 24, serving to increase the energy of the output pulses as tapped from resistor 24 and fed through coupling capacitor 22 to output terminal 23. Proper selection of values of resistor 24 and capacitors 12, 22 and 28 will provide an optimum time-constant, taking into consideration both the instantaneous pulse repetition frequency anticipated and a maximum pulse energy output desired. In addition, capacitors 12, 22, 28 and stray capacitance 35 will tend to prolong the duration of conduction of discharge device 14 for each input pulse, thereby providing for large energy pulses passing through meter 18 and consequent increased average-current readings. The large inverse resistance of diode 16 in Figure 1 keeps input pulse train 33 from appearing across resistor 24 and at output terminal 23.

The circuit of Figure 1 is particularly useful for employment in Geiger counter circuits and for pulse train frequency meters, upon inclusion of average-current indicator 18 in the cricuitry. This indicator will give a current reading the magnitude of which is equal to the average conduction current of gaseous discharge device 14. Hence, the average-current indication of indicator 18 will be proportional to the pulse repetition frequency of input pulse train 23. Further, ear phones 27 will provide the listener with audible "counts" of the input pulse signal while the current indicator may be calibrated directly in "counts" per period.

Figure 2:
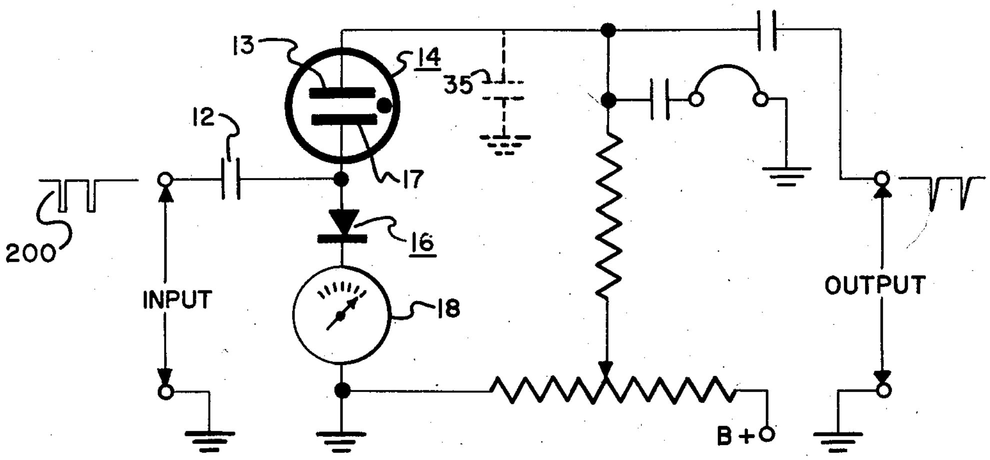
Figure 2 is a schematic diagram of a pulse integrator and amplifier circuit adapted to detect and amplify negative input pulses.

The circuit of Figure 2 is identical with the circuit of Figure 1, shown and above described, with the exception that diode 16 is removed from the circuit of electrode 13 and is included in the circuit of electrode 17, of gaseous discharge device 14; also, coupling capacitor 12 is connected to electrode 17 of discharge device 14, rather than to electrode 13. Such a revision of circuit configuration will make the pulse amplifier responsive to negative pulses.

The circuit of Figure 2 operates in identical manner as the circuit of Figure 1, with the exception that due to the modification in circuitry, the inverse resistance of diode 16 wil increase the input impedance of gaseous discharge device 14 and thus prevent negative pulse train 200 from being shorted to ground through low impedance meter 18.

In actual practice, there will be a practical limit to the instantaneous pulse repetition frequency which may be detected and amplified. Also, for optimum operation, potentiometer 20 may be adjusted so that the continuous potential applied to electrode 13 of gaseous discharge device 14 is in the order of 5 volts less than the "striking" potential of the device. In such a case, the input pulses would have to be pre-amplified so that the input pulse magnitude will always exceed this 5 volt potential difference and firing will occur.

The circuits above described are particularly useful for employment in portable Geiger counter apparatus and circuit-wise would immediately precede a conventional neon-tube ring counter. Pulse amplification in the manner described would serve to supply such a ring counter with a constant high-level pulse input, would also supply sufficient pulse energy to provide audible counts in the associated ear phones, and in addition would provide for visual readings of beta or gamma ray concentration through employment of an average-current indicator. Low-power consumption of an amplifier according to the present invention, which employs low-cost neon glow tubes, would render unnecessary the use in portable counter units of batteries which are physically large and heavy, an objection well taken with respect to portable counters presently in use.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A pulse integrator and amplifier circuit including, in combination, first and second input terminals for coupling to a pulse source, said first terminal being maintained at a reference potential, a first coupling capacitor coupled to said second terminal, a series circuit consisting of a diode having emitter and collector terminals, a gaseous discharge device having a first end-terminal being connected to said collector terminal of said diode and a second end-terminal, and an average-current indicator being connected to said emitter electrode of said diode, a first end-terminal of said series circuit being connected to said second end-terminal of said gaseous discharge device, a second end-terminal of said series circuit being connected to said average current indicator, said second end-terminal also being maintained at said reference potential, said first coupling capacitor being connected to said first end-terminal of said gaseous discharge device, a second capacitor, a first output terminal being connected through said second capacitor to said first end-terminal of said series circuit, a resistor having first and second end-terminals, said first end-terminal of said resistor being connected to the junction of said gaseous discharge device and said second capacitor, said second end-terminal of said resistor being maintained at a potential which is positive with respect to said reference potential, a listening device and a third capacitor, said listening device being connected through said third capacitor to said junction of said second capacitor and said gaseous discharge device, said listening device also being maintained at said reference potential, and a second output terminal likewise being maintained at said reference potential.

2. A pulse integrator and amplifier circuit including, in combination, first and second input terminals for coupling to a pulse source, said first terminal being maintained at a reference potential, a first coupling capacitor coupled to said second terminal, a series circuit consisting of a diode having emitter and collector terminals, a gaseous discharge device having a first end-terminal being connected to said collector terminal of said diode and a second end-terminal, and an average-current indicator being connected to said emitter electrode of said diode, a first end-terminal of said series circuit being connected to said second end-terminal of said gaseous discharge device, a second end-terminal of said series circuit being connected to said average-current indicator, said second end-terminal also being maintained at said reference potential, said first coupling capacitor being connected to said first end-terminal of said gaseous discharge device, a second capacitor, a first output terminal being connected through said second capacitor to said first end-terminal of said series circuit, a resistor having first and second end-terminals, said first end-terminal of said resistor being connected to the junction of said gaseous discharge device and said second capacitor, said second end-terminal of said resistor being maintained at an adjustable potential which is positive with respect to said reference potential, a listening device and a third capacitor, said listening device being connected through said third capacitor to said junction of said second capacitor and said gaseous discharge device, said listening device also being maintained at said reference potential, and a second output terminal likewise being maintained at said reference potential.

References Cited in the file of this patent

UNITED STATES PATENTS

| | | |
|---|---|---|
| 2,128,395 | Berndt et al. | Aug. 30, 1938 |
| 2,153,202 | Nichols | Apr. 4, 1939 |
| 2,174,500 | McMaster et al. | Sept. 26, 1939 |
| 2,228,367 | Sanders | Jan. 14, 1941 |
| 2,495,072 | Molloy | Jan. 17, 1950 |
| 2,570,442 | Grosdoff | Oct. 9, 1951 |
| 2,631,194 | Reeves | Mar. 10, 1953 |